UNITED STATES PATENT OFFICE.

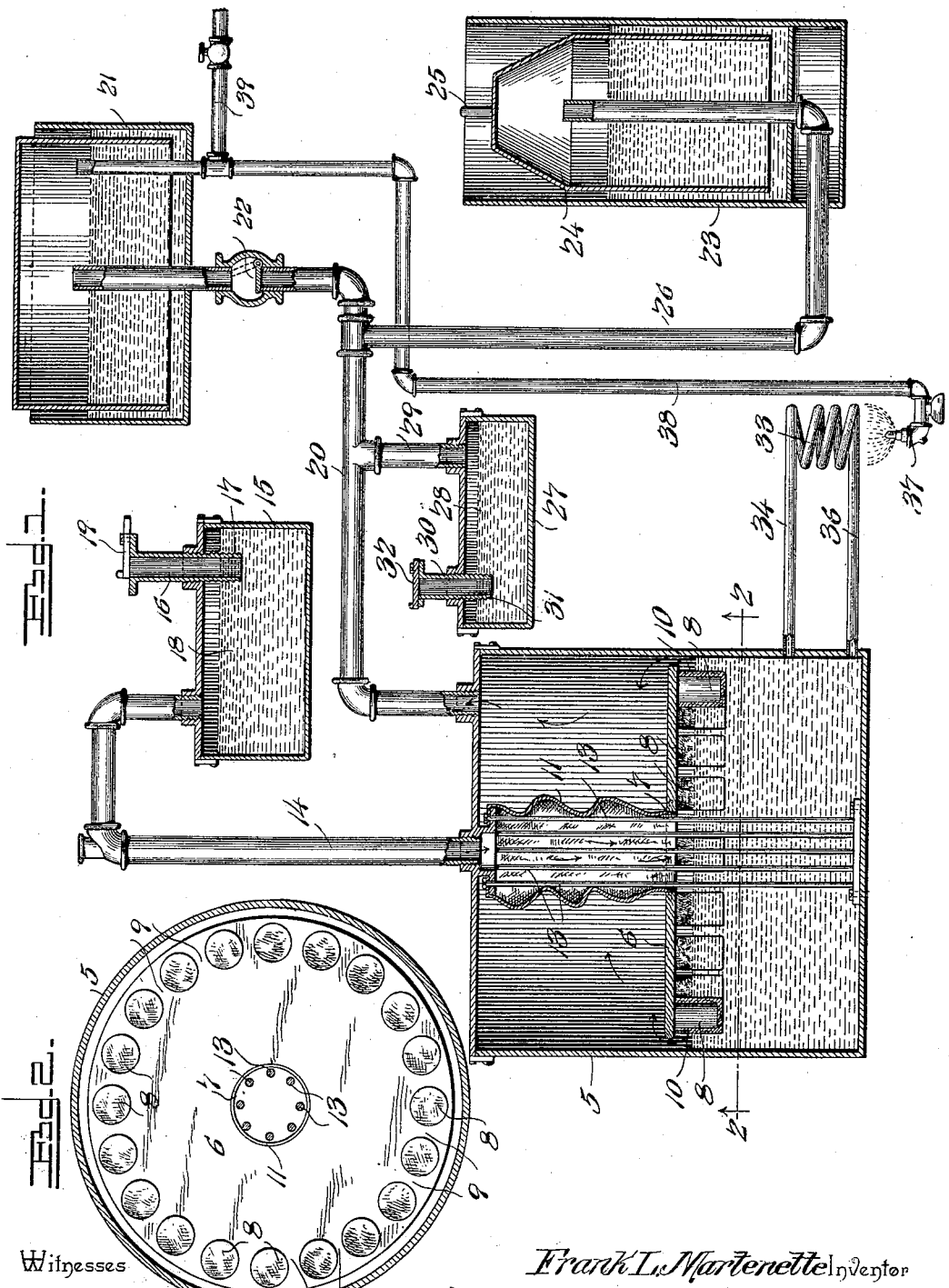

FRANK L. MARTENETTE, OF CHICO, CALIFORNIA.

CARBURETER.

SPECIFICATION forming part of Letters Patent No. 629,581, dated July 25, 1899.

Application filed March 1, 1899. Serial No. 707,288. (No model.)

*To all whom it may concern:*

Be it known that I, FRANK L. MARTENETTE, a citizen of the United States, residing at Chico, in the county of Butte and State of California, have invented a new and useful Apparatus for Carbureting Air in the Manufacture of Gas, of which the following is a specification.

My invention relates to an apparatus for carbureting air in the manufacture of gas, and it is more particularly designed as an improvement in the carbureter shown and described by the United States Letters Patent No. 613,167, issued to me October 25, 1898.

One object of the present invention is to simplify the carbureter disclosed by the Letters Patent herein recited by dispensing with certain of the elements forming a part of such apparatus, and thereby promote the efficiency of operation, prevent the escape of the carbureted air, and provide for the admission of atmospheric air to the carbureted air if the gas should become highly impregnated with the volatile vapors rising from the liquid hydrocarbon.

A further object of the invention is to provide improved means by which the inflowing current of atmospheric air may be conducted contiguous to the liquid hydrocarbon under all changes in the level thereof, so as to insure the proper admixture of the air with the volatile vapor.

With these ends in view the invention consists in the novel combination of elements and in the construction and arrangement of parts, which will be hereinafter fully described and claimed.

To enable others to understand the invention, I have illustrated the same in the accompanying drawings, forming a part of this specification, and in which—

Figure 1 is a sectional elevation of a carbureter constructed in accordance with my invention. Fig. 2 is a horizontal sectional plan view through the tank of the carbureter on the plane indicated by the dotted line 2 2, Fig. 1.

The same numerals of reference are used in both figures in the designation of identical parts.

The tank 5, which is adapted to contain the liquid hydrocarbon, is a metallic structure, preferably cylindrical in form, although the shape of the tank is not material. Within this tank is arranged a floatable baffle 6, which is adapted to be sustained a short distance above the level or surface of the liquid hydrocarbon contained within the tank. This floatable baffle is preferably, but not essentially, made of wood, and its diameter corresponds nearly to the internal dimensions of the tank, thus leaving a narrow annular space between the edge of the baffle and the wall of the tank for the air which is admitted to the tank to pass freely above the baffle. Said baffle is provided with a central opening 7, and to the lower surface of the baffle is secured a series of floats 8. The floats are arranged in annular series within the edge of the baffle, and these floats are spaced apart to leave the circulating-spaces 9 between the floats. Each float is preferably constructed of metal to provide a closed chamber which imparts the necessary buoyancy to the float and the floats and baffle are secured firmly together in any suitable way. The atmospheric air is intended to be conveyed by a suitable tube or hose through the central opening in the baffle, and the air is caused to circulate in the space between the baffle and the surface of the liquid hydrocarbon, whereby the air is conducted in contact with the hydrocarbon and along the lower face of the baffle, so as to cause the air to impinge against the floats as it circulates in the spaces named between said floats.

To more thoroughly diffuse the volatile hydrocarbon, I provide each of the floats 8 with a fibrous absorbent jacket 10, of any suitable material, and as the floats are immersed in the liquid hydrocarbon the fibrous jackets thereof become saturated with the hydrocarbon, so that the air as it circulates in the spaces between the floats is caused to absorb or take up the volatile vapor from the floats as well as from the surface of the liquid within the tank. The floats 8 which I employ are arranged on the under side of the baffle to extend a suitable distance downward therefrom, and in the practical service of the carbureter it is found that the floats, when immersed in the liquid hydrocarbon, will sustain the baffle 6 in position above the level or surface of the hydrocarbon, thus insuring a circulating-space between the baffle and the liquid.

The inflowing current of air to the carbureter-tank 5 is conducted to the under surface of the baffle through the medium of a pliable tube or hose 11, preferably made of felt. The lower end of this pliable air tube or hose is attached securely to the baffle 6 around the edges of the central opening 7 therein, but the upper end of the tube is united to the head of the tank 5 in any suitable way. Extending vertically through the tank is a series of guide-rods 13, which are fastened at their ends to the top and bottom of the tank. These guide-rods extend through the central opening 7 of the float and through the collapsible or pliable tube 11, whereby the rods are made to serve as guides for the float in directing the vertical travel thereof and to prevent the pliable tube from collapsing or closing together, thus maintaining the pliable tube in an open condition to insure the free passage of air from the head of the tank through the tube and to the lower surface of the baffle. The employment of these guide-rods is advantageous when the tank is nearly filled with the hydrocarbon and the float occupies a position near the upper head of the tank. It will be observed that the pliable tube collapses or falls together on the elevation of the floatable baffle, and as the liquid hydrocarbon is volatilized in the operation of carbureting air the level of the liquid gradually sinks lower in the tank. Of course the baffle descends as the liquid-level is lowered and the pliable tube is unfolded or straightened out by the downward travel of the float. It will therefore be understood that when the float is raised the guide-rods serve to prevent closure of the tube to such an extent as to impede the inflowing current of air, and thus the rods serve a highly-important purpose in my carbureter.

14 designates the air-supply pipe to the carbureter-tank. One end of this pipe is secured or coupled to the upper head of the tank to communicate with the pliable air-tube 11; but the other end of the inlet-pipe is connected to a water-trap 15. An air-tube 16 is united to the trap 15 at one side of the supply-pipe 14, and said air-pipe has its lower end extended into the trap 15 to provide a dip-foot 17, which is immersed in the liquid seal 18 of said trap 15. The outer protruding end of the air-pipe 16 is provided with a suitable controlling-valve 19, which in the operation of the apparatus is permitted to remain open for the free ingress of air to the trap 15, said valve 19 being adjustable to regulate the volume of air which may be admitted to the trap.

An off-bearing gas-pipe 20 is coupled to the carbureter-tank 5 in a suitable way, and this pipe leads to and is connected with a storage-gasometer 21 of any suitable construction. The pipe 20 is provided at a point contiguous to the gasometer with a check-valve 22, which is free to open in a direction toward the gasometer in order to permit the gas from the tank 5 to pass into the gasometer; but the pressure within the gasometer serves to close this check-valve 22 against the backflow of gas to the carbureter-tank.

In my apparatus I provide a pump mechanism to induce a current of air through the trap 15 and the carbureter-tank. This pump mechanism, as shown by Fig. 1, consists of a cylinder 23, adapted to contain a liquid seal, and in this cylinder is loosely fitted a bell-shaped plunger 24, which is immersed in the seal of the cylinder and is provided at its upper end with a suitable operating-handle 25. The pump mechanism is connected operatively with the off-bearing pipe 20 by means of a connecting-pipe 26, one end of which is extended into the cylinder of the pump mechanism, and the opposite end of said pipe is coupled to the off-bearing pipe 20 at a point between the check-valve 22 and the carbureter-tank 5.

In the operation of the apparatus it is found that under some circumstances the air becomes highly impregnated with the volatile vapor arising from the liquid hydrocarbon, and in order to reduce the richness of the gas or carbureted air I provide the reducing-trap 27. This trap is adapted to contain a liquid seal 28 and it is connected with the off-bearing pipe 20 by a pipe 29. An air-inlet pipe 30 is fastened to the reducing-trap 27 to have its dip-foot 31 immersed in the seal 28 of said trap, and on the protruding end of the pipe 30 is provided a regulating-valve 32, which is normally closed to prevent the air from flowing into the trap. The escape of gas from the pipe 20 through the trap 27 is prevented by having the dip-foot 31 of the pipe 30 immersed in the seal 28 and also by closing the valve 32; but when the gas is circulating from the carbureter-tank to the storage-gasometer the controlling-valve 32 is open. The suction created by the circulating current of gas breaks the seal around the dip-foot 31 of the trap-pipe 30, and thereby causes a current of air to flow through the pipe 30, the chamber of the trap 27, and the pipe 29, thus admitting a current of atmospheric air into the circulating current of gas passing through the pipe 20.

In the use of the apparatus during cold weather it has been demonstrated that the liquid hydrocarbon does not volatilize freely, and in order to promote volatilization of the liquid I have provided a heating appliance of the character represented by Fig. 1. A heating-coil 33 is situated exteriorly of the tank, preferably at the lower part thereof, and to this coil is connected the supply branch 36 of a circulating-pipe, the return branch of said circulating-pipe being indicated at 34. The two branches of the circulating-pipe are connected with the carbureter-tank on different levels to permit the cold liquid to pass through the supply branch 36, thence into the circulating-coil 33, to be heated thereby and returned to the tank 5 through the branch 34. A burner 37 of any suitable pattern, but preferably of the type known to the art as a "Bunsen" burner, is arranged below the circulating-coil 33, and the gaseous fuel necessary to insure operation of this Bunsen burner is supplied by a pipe 38, which, as shown by Fig. 1, is adapted to be coupled to the service-pipe 39. It will be understood, however, that in starting the apparatus gas from any suitable source of supply may be conducted through the pipe 38 to the burner in order to facilitate volatilization of the liquid within the carbureter-tank.

The gas-pipe used for illuminating or heating purposes is conveyed from the gasometer 21 through a service-pipe 39, which has a branch that extends through the gasometer-tank above the level of the liquid seal therein and into the floatable bell of said gasometer.

The operation may be described as follows: The tank 5 having been supplied in any suitable way with the liquid hydrocarbon, the valve 32 of the reducing-trap is closed and the valve 19 of the air-trap 15 is opened. The attendant now lifts the bell-shaped plunger of the pump mechanism one or more times, thus creating a suction through the pipe 26, the pipe 20, the carbureter-tank, and the pipe 14, which destroys the liquid seal around the dip-foot of the air-pipe 16. The air is free to flow through the pipe 16, the trap 15, and the pipe 14 into the collapsible tube of the carbureter-tank. The inflowing current of air circulates along the bottom of the floatable baffle-plate to insure the thorough commingling of the air with the vapor arising from the liquid hydrocarbon and attain the carbureting of the air which flows through the pipe 20 into the pipe 26 and thence to the bell-shaped plunger of the pump. On the down-stroke of the pump-plunger the carbureted air is forced through the pipe 26 and past the check-valve 22, so as to be forced into the gasometer; but this back pressure of the gas is prevented from flowing into the tank 5 by a check-trap 15, which is placed on the pipe 14. The operation of the plunger of the pump mechanism is continued until the desired quantity of carbureted air shall have been stored in the gasometer. When desired, the burner 37 may be started to heat the liquid hydrocarbon within the coil 33, and the circulation of the liquid is thus established from the tank to the coil and thence back to the tank to facilitate the vaporization of the hydrocarbon. To admit atmospheric air to the current of carbureted air circulating through the pipe 20, it is necessary to open the valve 32 in the pipe 30, and the suction created by the circulating current of air through the pipe 20 produces an inflowing current of air through the pipe 30, the trap 27, and the pipe 29.

Changes in the form, proportion, size, and the minor details of construction within the scope of the appended claims may be resorted to without departing from the spirit or sacrificing any of the advantages of this invention.

Having thus described the invention, what I claim is—

1. In an apparatus for carbureting air, the combination of a tank, means for admitting air thereto, a gasometer, a pump mechanism, an off-bearing pipe connected to the gasometer and the tank and having a branch connection with the pump mechanism, an inwardly-opening check-valve in said off-bearing pipe at a point adjacent to the gasometer, a sealed-air-inlet reducing-trap connected with the off-bearing pipe at a point between the carbureter-tank and the check-valve, and a valved air-inlet pipe connected to said reducing-trap and sealed by the liquid contents thereof, substantially as described.

2. In an apparatus for carbureting air, the combination with a liquid-tank and an air-inlet pipe coupled thereto, of a baffle having a central opening, a series of floats attached to and depending from the baffle to sustain the latter above the liquid-level, said floats arranged in series on the baffle outside of the central opening thereof and separated one from the other to provide intervening air-spaces, and a pliable tube connected to the tank and to the baffle to discharge the air through the central opening therein, substantially as described.

3. In an apparatus for carbureting air, the combination with a liquid-tank, and a supply-pipe connected thereto, of a floatable baffle within said tank, a pliable tube united to the tank and the baffle, and guides arranged to direct the baffle in its vertical travel and to engage with the collapsible tube for overcoming folding thereof on the elevation of the float, substantially as described.

4. In an apparatus for carbureting air, the combination with a tank, of a floatable baffle provided with a central opening, a pliable or collapsible tube connected to the tank and to the central opening of the baffle to discharge the air directly below the same, and fixed guide-rods extending through the opening of the baffle and passing through the collapsible tube, substantially as described.

5. In an apparatus for carbureting air, the combination with a liquid-tank, of a floatable baffle, a series of spaced floats united to the lower side of the baffle and provided with absorbent jackets, and a collapsible tube secured to the baffle and the head of the tank, said floats serving to sustain the baffle above the liquid, and the jackets being immersed in the liquid to be saturated thereby, substantially as described.

In testimony that I claim the foregoing as my own I have hereto affixed my signature in the presence of two witnesses.

FRANK L. MARTENETTE.

Witnesses:
 H. W. HEATH,
 A. H. CREW.